Feb. 12, 1952     A. CHILTON     2,585,626
TURBINE MECHANISM FOR DRIVING
THE FUEL PUMPS OF ROCKETS
Filed Sept. 19, 1947     2 SHEETS—SHEET 1
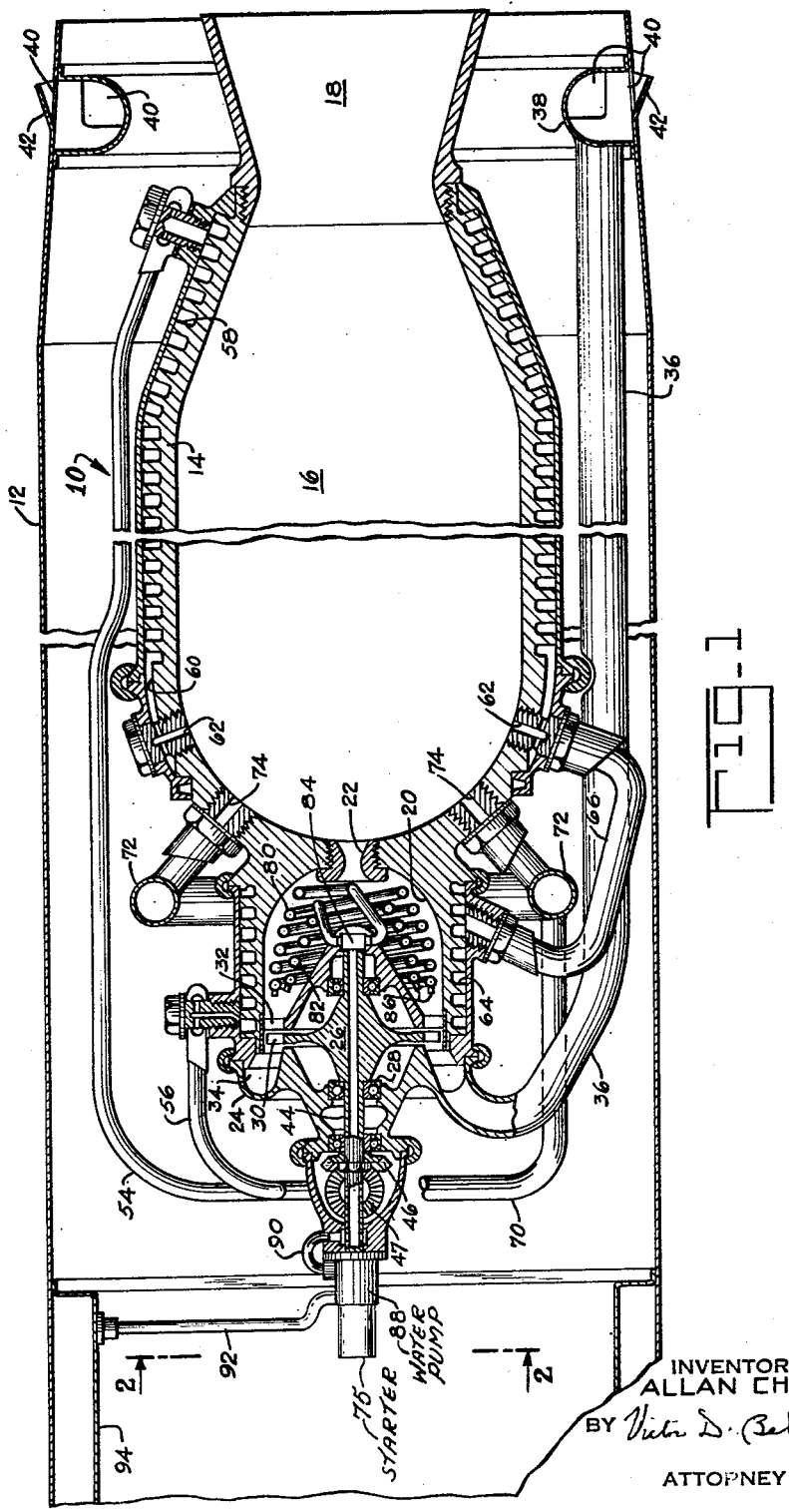
INVENTOR
ALLAN CHILTON
BY
ATTORNEY

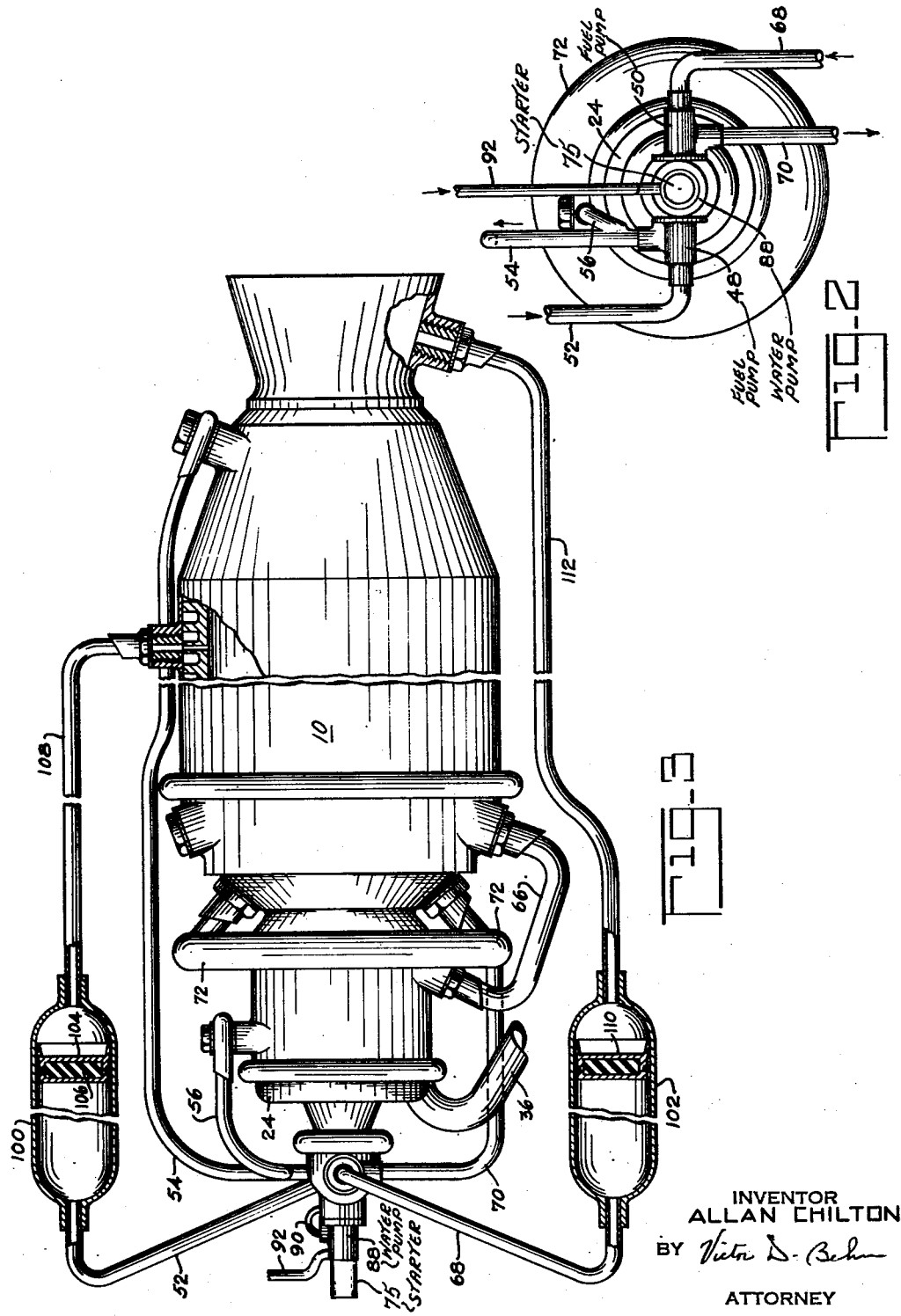

Patented Feb. 12, 1952

2,585,626

UNITED STATES PATENT OFFICE 2,585,626

TURBINE MECHANISM FOR DRIVING THE
FUEL PUMPS OF ROCKETS

Allan Chilton, Ridgewood, N. J., assignor to
Curtiss-Wright Corporation, a corporation of
Delaware Application September 19, 1947, Serial No. 774,992

4 Claims. (Cl. 60—35.6)

This invention relates to rocket power plants and is particularly directed to means for supplying one or more of the elements of combustion mixture to the rocket combustion chamber. The combustion mixture of a rocket power plant generally comprises a fuel such as gasoline or alcohol and an oxidizing agent such as liquid oxygen. Such fuels and oxidizing agents or equivalent substances are herein termed "combustion agents."

One of the problems in the design of a rocket power plant using liquid combustion agents is the provision of means for forcing or pumping the combustion agents into the combustion chamber of the rocket power plant. In most small rocket power plants this has been accomplished by means of pressure bottles, each containing a combustion agent under pressure. However, this pressured bottle system is quite cumbersome for the larger rocket power plants. An object of the invention comprises the provision of a novel and simple means for pumping one or more of the combustion agents into the combustion chamber of a rocket power plant. Specifically this feature of the invention comprises a rocket power plant including a turbine drivably connected to means for pumping the combustion agents into the combustion chamber of said power plant, said turbine being driven by the rocket combustion gases in such a way as not to materially affect the overall efficiency of the rocket power plant.

A further object of the invention comprises the addition of means for cooling the combustion gases driving said turbine without cooling the combustion gases in the combustion chamber of said rocket power plant. This feature of the invention comprises means for generating steam from the heat of the combustion gases supplied to said turbine and utilizing said steam to help drive said turbine. A still further object of the invention comprises means to increase the pressure at the inlet side of said combustion agent pumps by pressurizing the combustion agent storage containers by a pressure derived from the pressure of the rocket combustion gases.

Other objects of the invention will become apparent upon reading the annexed detailed description in connection with the drawing in which:

Figure 1 is a sectional view through a rocket power plant embodying the invention;

Figure 2 is an end view of the rocket power plant taken along line 2—2 of Figure 1; and Figure 3 is a side view partly in section illustrating the rocket power plant of Figure 1 and in addition illustrating means for pressurizing the storage containers of the combustion agents.

Referring first to Figures 1 and 2, a rocket power plant 10 is supported within an outer casing or shell 12 of the rocket, said rocket power plant comprising a housing 14 providing a combustion chamber 16 having a rearwardly directed discharge opening 18. In addition the housing 14 is formed to provide an auxiliary chamber 20 co-axial with the chamber 16 and communicating therewith through a small orifice 22. The forward end of the auxiliary chamber 20 is closed by a cover member 24 and a turbine rotor 26 is supported in said chamber by means of bearings 28.

The turbine rotor 26 is provided with blades 30. Suitable guide vanes 32 are supported within the auxiliary chamber 20 for directing combustion gases against said rotor blades 30 for driving the turbine rotor 26. From the turbine blades 30 said combustion gases exhaust into a ring 34 communicating with a rearwardly extending exhaust duct 36. The exhaust duct 36 communicates with an annular exhaust manifold 38 carried on the inside of the rocket shell 12. A plurality of discharge openings 40 are formed in the manifold 38 through which the exhaust gases discharge into the surrounding atmosphere. The openings 40 are formed in the manifold 38 by flaps 42 projecting therefrom beyond the shell 12.

The turbine rotor 26 is formed rigid with a shaft 44 which extends forwardly and is connected to a bevel gear 46. The bevel gear 46 is drivably connected to a pair of diametrically opposed fuel pumps 48 and 50 (see Figure 2) through bevel gears 47, one of which can be seen in Figure 1. The pumps 48 and 50 when driven by the turbine 26 supply the combustion agents to the rocket combustion chamber 16. The pump 48 is provided with a conduit 52 through which a combustion agent—such as gasoline—is supplied from a suitable storage container. The pump 48 delivers said combustion agent to a pair of conduits 54 and 56. The conduit 54 extends to the rear portion of the rocket power plant into communication with spiral grooves 58 formed about the rocket housing 14. The forward ends of such spiral grooves terminate in an annulus 60 communicating with a plurality of nozzles 62 through which the combustion agent, delivered by the pump 48, discharges into the rocket combustion chamber 16. In this way the liquid combustion agent flowing along the grooves 58 cools the walls of the rocket combustion chamber 16.

The other discharge conduit 56 of the pump 48 communicates with one end of spiral grooves 64 formed about the wall of the auxiliary chamber 20 so that the liquid combustion agent flowing therethrough cools the walls of said auxiliary chamber. A conduit 66 interconnects the other end of the spiral grooves 64 with the annulus 60 and the nozzles 62 so that all of the combustion agent delivered by the pump 48 is fed into the rocket combustion chamber 16 through the plurality of nozzles 62.

The pump 50 is provided with a conduit 68 through which a combustion agent such as liquid oxygen is supplied from a suitable storage container. The pump 50 delivers said combustion agent to a conduit 70 and a manifold 72 from which it is supplied to a plurality of nozzles 74 into the rocket combustion chamber 16.

For starting purposes, a suitable electric starter motor 75 may be arranged for driving the turbine rotor 26 and pumps 48 and 50 whereupon the combustion agents are supplied to the rocket combustion chamber 16 by said pumps. The mixture of the combustion agents, such as gasoline and liquid oxygen, generally ignites spontaneously. However, if desired or necessary, suitable ignition means—such as a conventional electric spark-gap—may be provided in the combustion chamber 16. This starting apparatus forms no part of the present invention and therefor no further description of said apparatus is deemed necessary.

Upon combustion in the rocket chamber 16, the combustion gases discharge rearwardly through the discharge opening 18 to provide the rocket with forward thrust. In addition a small percentage of the gases expands into the auxiliary chamber 20 through the orifice 22. From the auxiliary chamber 20 the gases are directed against the rotor blades 30 by the stator vanes 32 thereby driving the turbine rotor 26 and the pumps 48 and 50. The turbine exhaust gases discharge through the exhaust conduit 36 and manifold 38 out through the openings 40. Because of the high speed operation of the rocket, the air flow over the projecting flaps 42 produces a substantial reduction in pressure on the downstream sides of said flaps at the openings 40. This reduction in the exhaust discharge pressure of the turbine increases the pressure difference across the turbine rotor blades 30 thereby increasing the power output of the turbine. The size of the orifice 22 determines the power supplied to and therefore the power output of the turbine 26.

The size of the orifice 22 is sufficiently small so that said orifice offers more resistance to flow therethrough into the auxiliary chamber 20 than the resistance to flow from said chamber offered by the turbine and the turbine exhaust passage. Therefore the combustion gases expand into the auxiliary chamber 20 through the orifice 22 whereby the temperature of the combustion gases in the auxiliary chamber 20 is less than the temperature of the combustion gases in the rocket combustion chamber 16. However, with the aforedescribed construction and for a particular rocket power plant, the temperature of the combustion gases within the auxiliary chamber 20 may be too high for safe operation of the turbine. Accordingly, means may be provided for reducing the temperatures of the exhaust gases within the auxiliary chamber 20 without affecting the temperature of the gases within the rocket combustion chamber 16.

In order to reduce the temperature of the gases within the auxiliary chamber 20, a steam generator is provided within the chamber 20. As illustrated the steam generator comprises a pair of spaced coils 80 and 82, each communicating at one end with a chamber 84 formed at the rear end of the turbine shaft 44. The other ends of the coils 80 and 82 are provided with a plurality of nozzles 86 from which the steam, generated in said coils, discharges into the auxiliary chamber 20 toward the vanes 32. The turbine shaft 44 is made hollow and extends forwardly to drive a water pump 88. The discharge side of the pump 88 communicates with the interior of the hollow shaft 44 through a conduit 90. Water is supplied to the pump 88 through a conduit 92 communicating with an annular water supply tank 94. The water supply tank is supported within the rocket shell 12 forwardly of the power plant 10, whereby there always is a head of water on the water pump 88 as the rocket rises.

With this arrangement of the water pump 88 and associated steam generator, the pump 88 is driven by the turbine rotor 26 and supplies water to the steam generator coils 80 and 82 through the hollow turbine shaft 44. The water in the coils 80 and 82 is heated by the combustion gases within the auxiliary chamber 20 thereby cooling said gases. The coils 80 and 82 act as a flash steam boiler turning water into steam at their discharge nozzles 86. The steam discharging from the nozzles 86 mixes with the combustion gases within the auxiliary chamber 20 thereby further cooling said gases. The mixtures of steam and combustion gases is directed against the turbine rotor blades by the guide vanes 32 to drive the turbine rotor 26.

Figure 3 is a side view of the rocket power plant of Figure 1 without the outer rocket shell 12. In addition Figure 3 illustrates storage containers 100 and 102 for the rocket combustion agents together with means for pressurizing said containers. As illustrated the storage container 100 is provided with a slidable partition 104 having a core 106 of heat insulating material. The combustion agent is stored in the container 100 on one side of the partition 104 and the other side of said partition communicates with a selected portion of the rocket combustion chamber through a conduit 108. In this way gas pressure within the rocket combustion chamber is transmitted through the conduit 108 thereby pressurizing the combustion agent stored in the container 100. This pressure on the combustion agent in the container 100 helps the pump 48 supply said agent to said combustion chamber. The storage container 102 is similarly pressurized although not necessarily from the same portion or the rocket combustion chamber 16. Thus, as illustrated, the storage container 102 is provided with a slidable partition 110 having one side communicating with a portion of the discharge opening 18 of the rocket combustion chamber 16 through a conduit 112. The location of the combustion chamber ends of the conduits 108 and 112 depends on the extent to which it is desired to pressurize their respective containers 100 and 102.

While I have described my invention in detail in its present preferred embodiment, it will be obvious to those skilled in the art, after understanding my invention, that various changes and modifications may be made therein without de-

I claim as my invention:

1. In a rocket type power plant, a combustion chamber having a nozzle through which the combustion gases discharge for providing said power plant with propulsive thrust; pump means for supplying a combustion agent to said chamber; an auxiliary chamber; a passageway providing restricted communication between said chambers through which a portion of the combustion gases expand from said combustion chamber into said auxiliary chamber; passage means disposed in heat exchange relation with combustion gases in said auxiliary chamber, said passage means having an opening communicating with said chamber, pump means for circulating a relatively cool liquid through said passage means and through said opening into said auxiliary chamber, at least a portion of said liquid being vaporized by the heat of the combustion gases within said auxiliary chamber; a turbine arranged to be driven by the gases discharging from said auxiliary chamber; and means drivably connecting both of said pump means to said turbine.

2. In a rocket type power plant, a combustion chamber having a nozzle through which the combustion gases discharge for providing said power plant with propulsive thrust; pump means for supplying a combustion agent to said chamber; an auxiliary chamber; a passageway providing restricted communication between said chambers through which a portion of the combustion gases expand from said combustion chamber into said auxiliary chamber; a coiled conduit disposed in said auxiliary chamber and having a discharge opening therein; pump means for circulating a relatively cool liquid through said passage means and through said opening into said auxiliary chamber, at least a portion of said liquid being vaporized by the heat of the combustion gases within said auxiliary chamber; a turbine arranged to be driven by the gases discharging from said auxiliary chamber; and means drivably connecting both said pump means to said turbine.

3. In a rocket type power plant, a combustion chamber having a nozzle through which the combustion gases discharge for providing said power plant with propulsive thrust; a storage tank for a combustion agent; a passageway between said tank and combustion chamber; pump means in said passageway for supplying said combustion agent from said tank to said chamber; means for pressurizing said tank with a pressure of combustion gases obtained from said combustion chamber; an auxiliary chamber; a passageway providing restricted communication between said chambers through which a portion of the combustion gases expand from said combustion chamber into said auxiliary chamber; passage means disposed in heat exchange relation with combustion gases in said auxiliary chamber, said passage means having an opening communicating with said chamber, pump means for circulating a relatively cool liquid through said passage means and through said opening into said auxiliary chamber, at least a portion of said liquid being vaporized by the heat of the combustion gases within said auxiliary chamber; a turbine arranged to be driven by the gases discharging from said auxiliary chamber; and means drivably connecting both of said pump means to said turbine.

4. In a rocket type power plant, a combustion chamber having a nozzle at one end through which the combustion gases discharge for providing said power plant with propulsive thrust; pump means for supplying a combustion agent to said chamber; an auxiliary chamber disposed adjacent to the other end of combustion chamber and having an annular discharge nozzle co-axial with but directed oppositely to said combustion chamber nozzle; a passageway co-axial with said nozzles and providing restricted communication between said chambers for expansion of combustion gases from said combustion chamber into said auxiliary chamber; passage means disposed in heat exchange relation with combustion gases in said auxiliary chamber, said passage means having an opening communicating with said chamber; pump means for circulating a relatively cool liquid through said passage means and through said opening into said auxiliary chamber, at least a portion of said liquid being vaporized by the heat of the combustion gases within said auxiliary chamber; a turbine arranged to be driven by the gases discharging through said annular nozzle of the auxiliary chamber; and means drivably connecting both said pump means to said turbine.

ALLAN CHILTON.

REFERENCES CITED

The following references are of record in the file of this patent:

UNITED STATES PATENTS

| Number | Name | Date |
| --- | --- | --- |
| 1,806,133 | Thomas | May 19, 1931 |
| 2,395,113 | Goddard | Feb. 19, 1946 |
| 2,407,852 | Smith | Sept. 17, 1946 |
| 2,408,111 | Traux et al. | Sept. 24, 1946 |

FOREIGN PATENTS

| Number | Country | Date |
| --- | --- | --- |
| 522,163 | France | Mar. 22, 1921 |
| 625,104 | France | Apr. 19, 1927 |
| 374,663 | Italy | Sept. 4, 1939 |